(12) United States Patent
Preukschat et al.

(10) Patent No.: US 8,651,251 B2
(45) Date of Patent: Feb. 18, 2014

(54) REGULATED DASHPOT WITH SHOCK-ABSORPTION FORCE CONTROLS

(75) Inventors: Alfred Preukschat, Koenigswinter (DE); Jurgen Adamek, Ennepetal (DE)

(73) Assignee: ThyssenKrupp Bilstein Suspension GmbH, Ennepetal (DE)

( * ) Notice: Subject to any disclaimer, the term of this patent is extended or adjusted under 35 U.S.C. 154(b) by 0 days.

(21) Appl. No.: 13/587,057

(22) Filed: Aug. 16, 2012

(65) Prior Publication Data

US 2012/0305354 A1 Dec. 6, 2012

Related U.S. Application Data

(60) Continuation of application No. 12/716,898, filed on Mar. 3, 2010, which is a division of application No. 10/008,895, filed on Dec. 7, 2001, now Pat. No. 7,699,147.

(30) Foreign Application Priority Data

Dec. 16, 2000 (DE) .................................. 100 62 999

(51) Int. Cl.
*F16F 9/348* (2006.01)

(52) U.S. Cl.
USPC ........................................................ 188/282.4

(58) Field of Classification Search
USPC ............. 188/313, 266.5, 266.6, 282.2, 282.4, 188/282.6, 286, 322.13
See application file for complete search history.

(56) References Cited

U.S. PATENT DOCUMENTS

| | | | |
|---|---|---|---|
| 1,540,341 A | 6/1925 | Kirby | |
| 2,838,140 A | 6/1958 | Rasmusson et al. | |
| 3,960,251 A | 6/1976 | Gorissen | |
| 4,650,042 A | 3/1987 | Knecht et al. | |
| 4,655,440 A | 4/1987 | Eckert | |
| 4,685,698 A | 8/1987 | Klinkner et al. | |
| 4,821,849 A | 4/1989 | Miller | |
| 4,936,423 A | 6/1990 | Karnopp | |
| 4,986,393 A * | 1/1991 | Preukschat et al. | 188/266.6 |
| 5,024,302 A | 6/1991 | Karnopp | |
| 5,328,004 A | 7/1994 | Fannin et al. | |
| 5,372,378 A * | 12/1994 | Seufert | 280/5.519 |
| 5,375,683 A | 12/1994 | Huang et al. | |
| 5,588,510 A | 12/1996 | Wilke | |
| 5,611,413 A | 3/1997 | Feigel | |
| 5,647,461 A | 7/1997 | Jensen et al. | |
| 5,682,968 A | 11/1997 | Boichot et al. | |
| 5,996,748 A | 12/1999 | Nezu et al. | |
| 6,321,888 B1 | 11/2001 | Reybrouck et al. | |
| 6,394,238 B1 | 5/2002 | Rogala | |
| 6,467,593 B1 | 10/2002 | Corradini et al. | |
| 2002/0121416 A1* | 9/2002 | Katayama et al. | 188/314 |

FOREIGN PATENT DOCUMENTS

| | | |
|---|---|---|
| DE | 38 03 888 C2 | 8/1990 |
| DE | 100 40 518 C1 | 2/2002 |

* cited by examiner

*Primary Examiner* — Xuan Lan Nguyen
(74) *Attorney, Agent, or Firm* — Crowell & Moring LLP (57) ABSTRACT

A regulable dashpot with shock-absorption force controls, especially intended for motor vehicles, with at least one flow-regulating system including one or more shock-absorption components for the compression phase and/or for the decompression phase. The object is to allow the dashpot to shift continuously between the hard and soft phases, whereby the valve-adjustment intervals can be varied at intervals that are not unnecessarily short or even unattainable. At least one valve assembly is accordingly supplied with variable flow impedance by regulating valve.

11 Claims, 13 Drawing Sheets

Fig. 14

REGULATED DASHPOT WITH SHOCK-ABSORPTION FORCE CONTROLS

CROSS REFERENCE OF RELATED APPLICATIONS

This application is a continuation of U.S. application Ser. No. 12/716,898, filed Mar. 3, 2010, which is a divisional of U.S. application Ser. No. 10/008,895, filed Dec. 7, 2001.

CLAIM OF PRIORITY

The present application claims priority from German application serial No. 100 62 99.7, filed on Dec. 16, 2000, the content of which is hereby incorporated by reference into this application.

BACKGROUND AND SUMMARY OF THE INVENTION

The present application concerns a regulated dashpot with shock-absorption force controls, especially intended for motor vehicles.

Regulated hydraulic dashpots with a flow-regulating system that shifts back and forth between compression and decompression phases in operation are known. Dashpots of this genus are described in German patent document DE 3803888C2 for instance.

One drawback of such dashpots is that their design permits them to shift only suddenly between the hard and soft phases, limiting the range of control. The comfort of the ride can be increased only to a limited extent.

One object of the present invention, therefore is to provide a dashpot of the aforesaid genus that can shift continuously between the hard and soft phases, whereby the valve-adjustment intervals can be varied at intervals that are not unnecessarily short or even attainable.

This and other objects and advantages are achieved by the regulated dashpot according to the present invention, which achieves a continuous transition between hard and soft phases in a simple manner. Valve-adjustment intervals can be maintained long enough to allow the device to be manufactured at justifiable component costs and to be operated at low requisite adjustment powers.

One particular advantage is that the flow-regulating system can be modular and employed in different vehicles with various shock-absorption performances. Since there will be no sudden jolts when shifting between the hard and soft phases and vice versa, riding comfort will be considerably improved.

Other objects, advantages and novel features of the present invention will become apparent from the following detailed description of the invention when considered in conjunction with the accompanying drawings.

DETAILED DESCRIPTION OF THE DRAWINGS

The figures illustrate hydraulic circuitry specific to various dashpots. Each dashpot includes a piston 3 mounted on the end of a piston rod 2 and traveling back and forth inside a cylinder 1. A reservoir 4 contains a compressed gas that compensates for the volume of hydraulic fluid displaced by piston 3. Reservoir 4 can be integrated into the dashpot.

Figure 1:
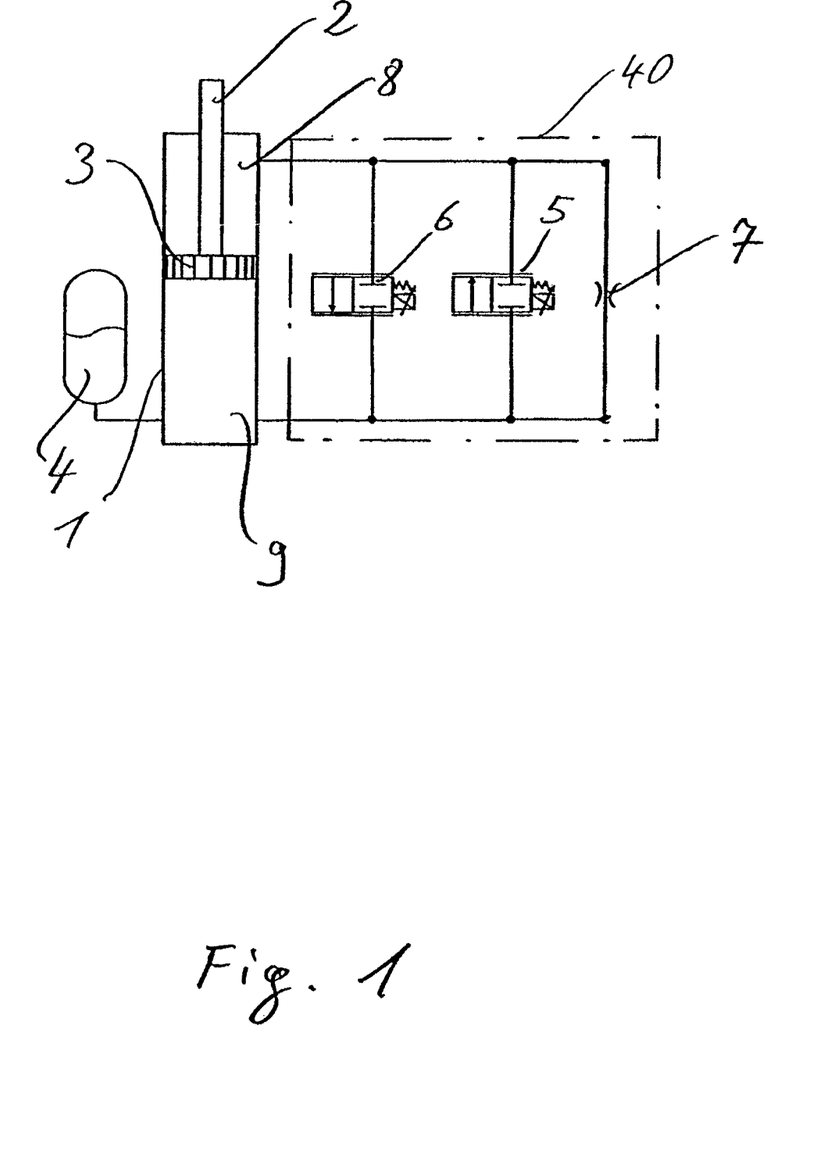
FIG. 1 is a schematic illustrating how a dashpot can be regulated in accordance with a single-chamber principle.

FIG. 1 illustrates the hydraulic circuitry for a dashpot in accordance with the present invention. The dashpot includes two hydraulically parallel regulating valves 5 and 6. Hydraulically paralleling both regulating valves 5 and 6 is a very narrowly constricted bypass valve 7, which can alternatively be integrated into one or both regulating valves. Bypass valve 7 provides a minimal passage for the hydraulic fluid and accordingly prevents the dashpot from being entirely blocked while regulating valves 5 and 6 are closed. When closed, regulating valves 5 and 6 provide continuous regulation of the two phases (compressions, decompression) and, when closed allow the fluid to flow. Regulating valve 5 regulates the flow while piston 3 is traveling in the compression direction (compression phase) and regulating valve 6 regulates it while the piston is traveling in the decompression direction (decompression phase). The rate of flow depends on the one hand on the difference between the pressure in an upper chamber 8 and that in a lower chamber 9, the two chambers being separated by piston 3, and on the other hand on the cross-section of the passage through regulating valves 5 and 6, as dictated by flow controls like those known from German patent document 10 040 518.

Figure 2:
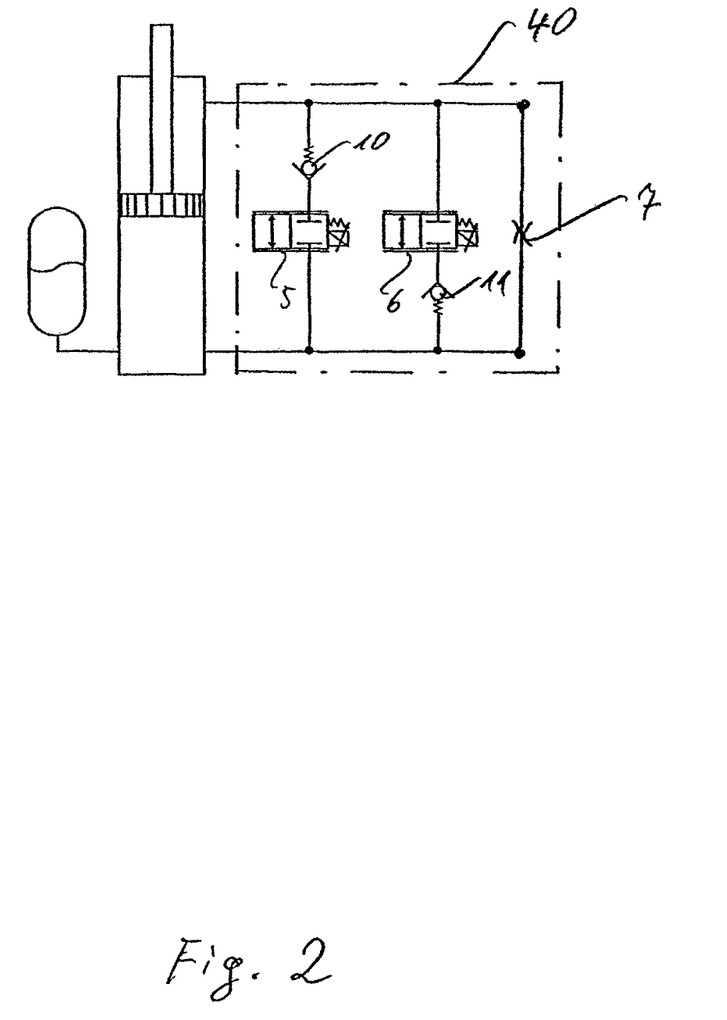
FIGS. 2 through 11 are schematics illustrating various other approaches to regulation in accordance with the single-chamber principle.

FIG. 2 illustrates another embodiment of the circuitry illustrated in FIG. 1. In this embodiment, fluid can flow through both regulating valves 5 and 6 from either end as long as they are open, and the operative direction is prescribed by external checkvalves 10 and 11.

Figure 3:
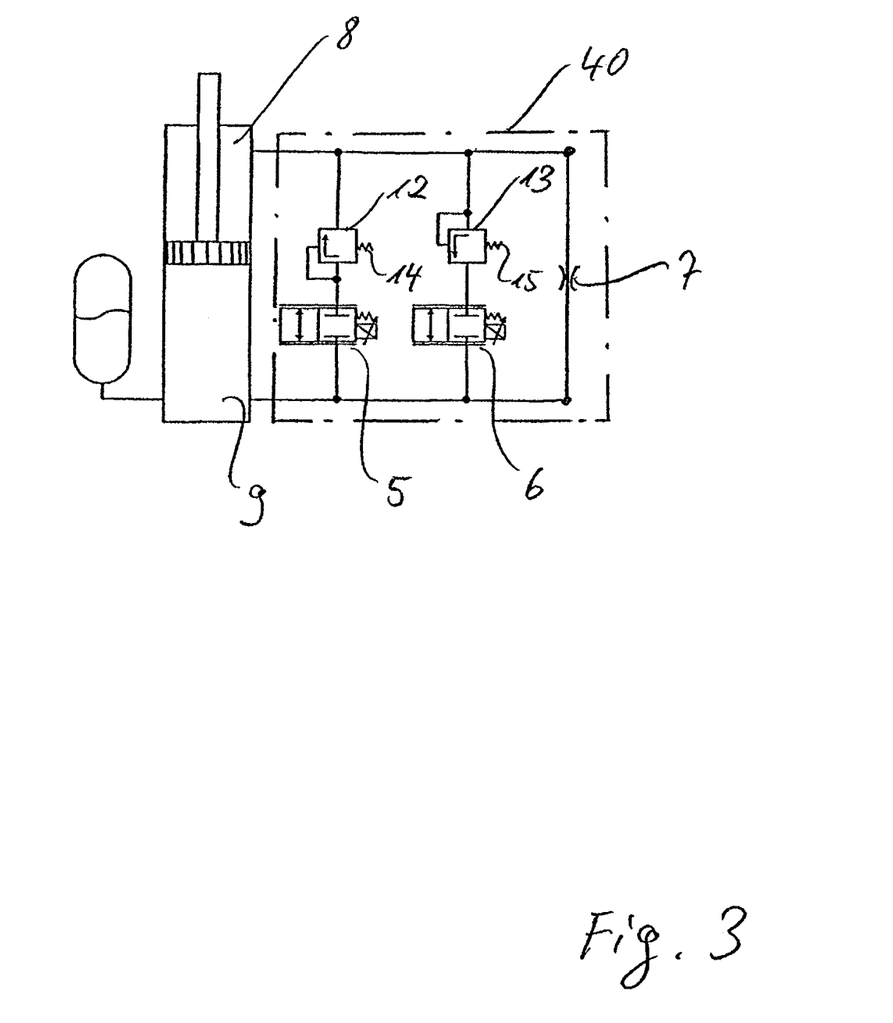

FIG. 3 illustrates an advanced version of the circuitry illustrated in FIG. 2. It employs spring-loaded checkvalves 12 and 13 instead of the external checkvalves 10 and 11. Such checkvalves will open to an extent that depends on the difference in pressure between chambers 8 and 9. The type of springs employed determines the intended performance curve of the dashpot in both compression and the decompression phases.

Figure 4:
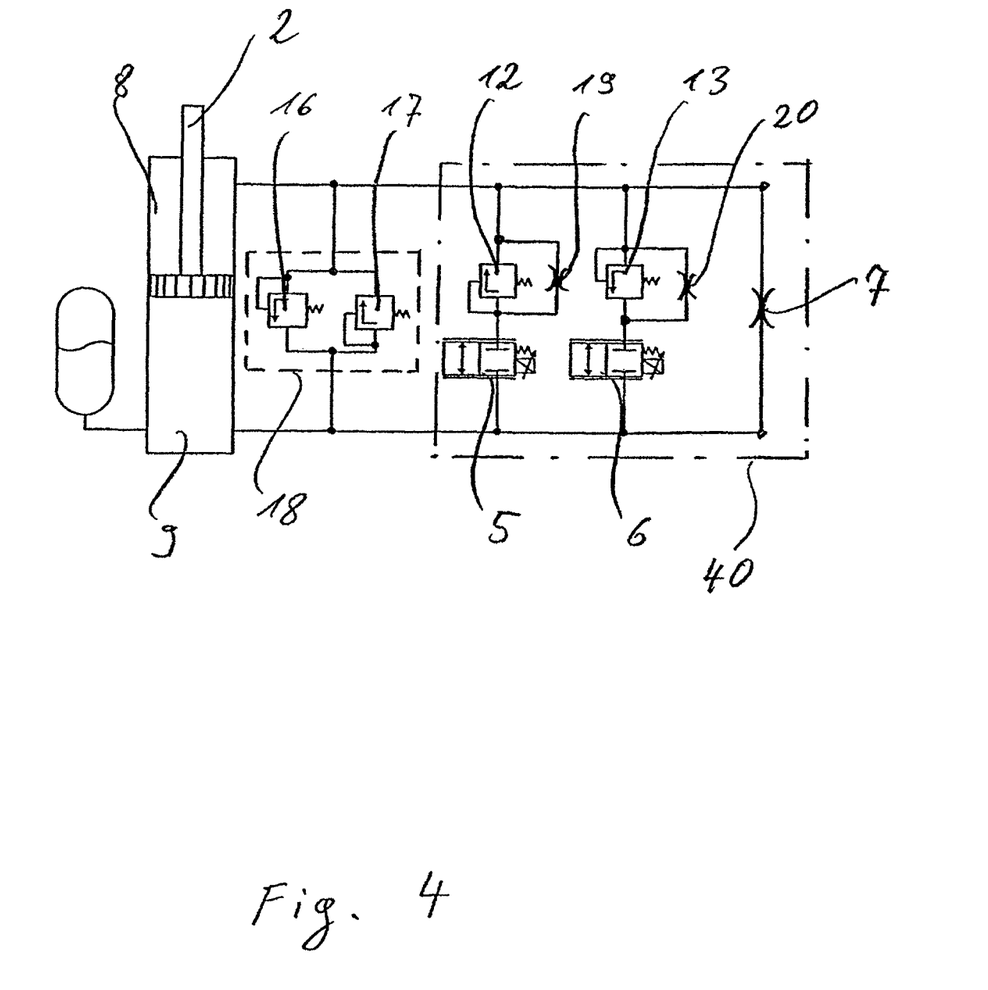

FIG. 4 illustrates an advanced version of the circuitry illustrated in FIG. 3. It includes a valve assembly 18 comprising unregulated spring-loaded checkvalves 16 and 17 that parallel regulated spring-loaded checkvalves 12 and 13. Checkvalves 16 and 17 parallel each other hydraulically and operate independently in both the compression and the decompression phases. Valve assembly 18 can be integrated into piston 3 and acts as a standard spring loaded piston. The performance curve for valve assembly 18 is set to "hard" and that of regulated spring-loaded checkvalves 12 and 13 to "soft". Regulating valves 5 and 6 can accordingly now switch independently of each other and continuously back and forth between hard and soft in both the compression and the decompression phases. In addition to bypass valve 7, bypass valves 19 and 20 can be introduced paralleling spring-loaded checkvalves 12 and 13.

This embodiment ensures constantly reliable driving performance even when the electricity or electronics fail. In such an event, regulating valves 5 and 6 will substantially close, and continued operation of the dashpot will be ensured by the mechanical action of the spring-loaded checkvalves 16 and 17 in valve assembly 18 at a hard performance curve, preferably within piston 3, that is.

Figure 5:
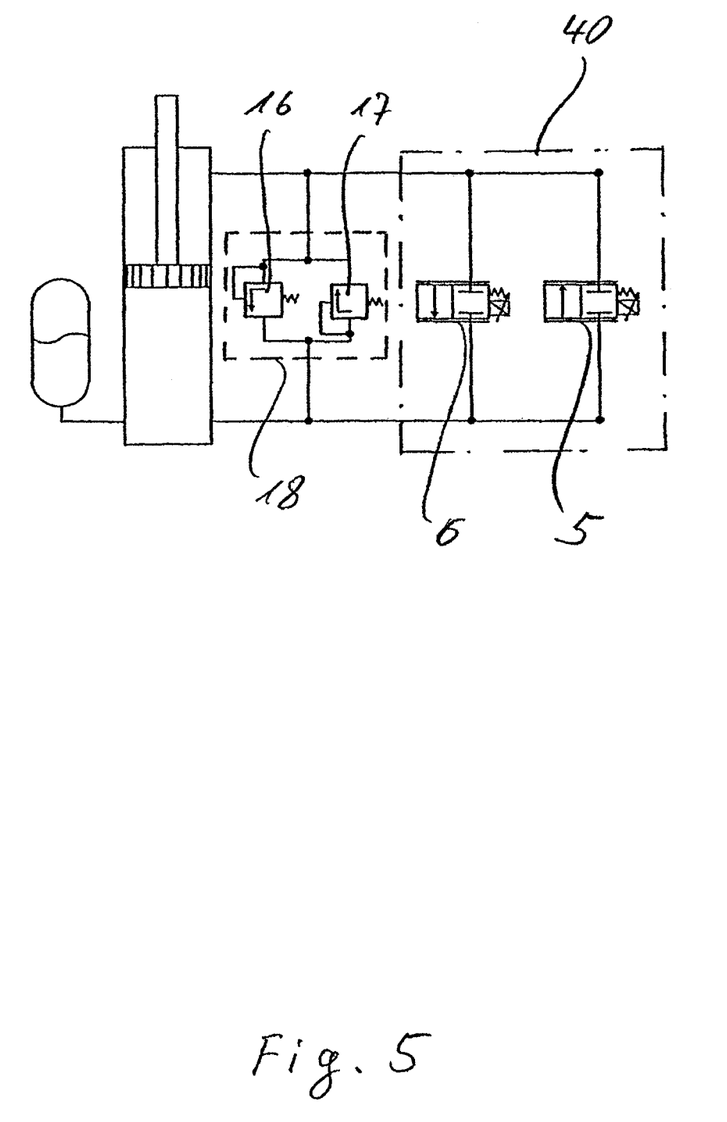

The embodiment illustrated in FIG. 5 lacks the regulated spring-loaded checkvalves 12 and 13 employed in the embodiment illustrated in FIG. 4. This embodiment is an advanced version of the regulable dashpot illustrated in FIG. 1, employing a parallel valve assembly 18 like that in the version illustrated in FIG. 4. The bypass valve can also be eliminated.

Figure 6:
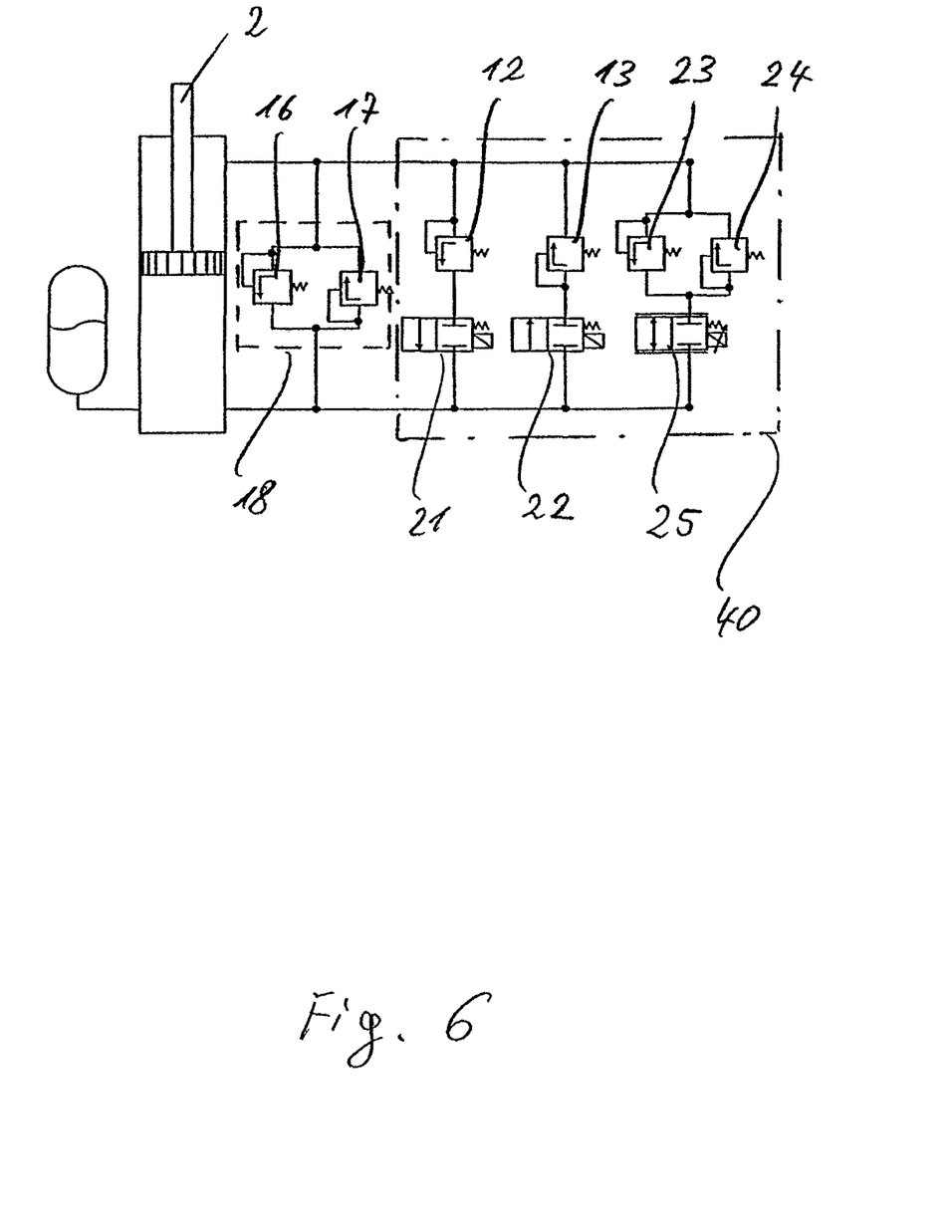

FIG. 6 illustrates an alternative to the embodiment illustrated in FIG. 5. Paralleling a valve assembly 18 that comprises unregulated spring-loaded checkvalves 16 and 17 with their hard performance curve are two similar spring-loaded checkvalves 12 and 13 with a soft performance curve. Checkvalves 12 and 13 can be brought into play by way of associated hydraulic switches 21 and 22, allowing a soft performance curve to be introduced while piston 3 is traveling in either the compression or the decompression direction. Paralleling these are two parallel one-way checkvalves 23 and 24 with a soft performance curve that can be actuated and regulated by a regulating valve 25. This circuitry again allows the shock-absorption performance curves to be established anywhere between hard and soft independently of each other as desired with the piston traveling in either direction.

Figure 7:
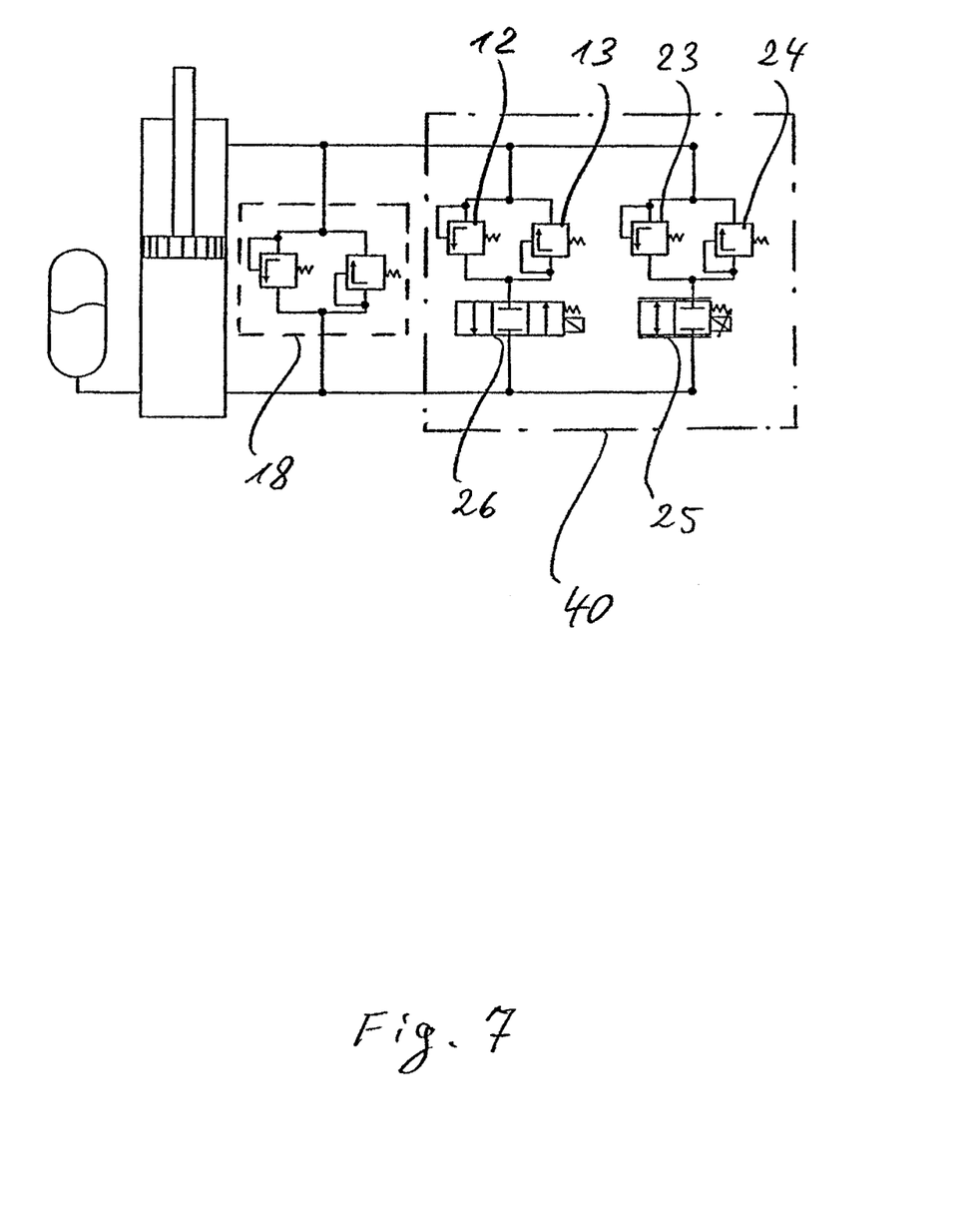

Circuitry similar to that illustrated in FIG. 6 can be attained as illustrated in FIG. 7. the soft checkvalves 12 and 13 in this embodiment are provided with a two-to-three way valve 26 instead of two individual switching valves.

Figure 8:
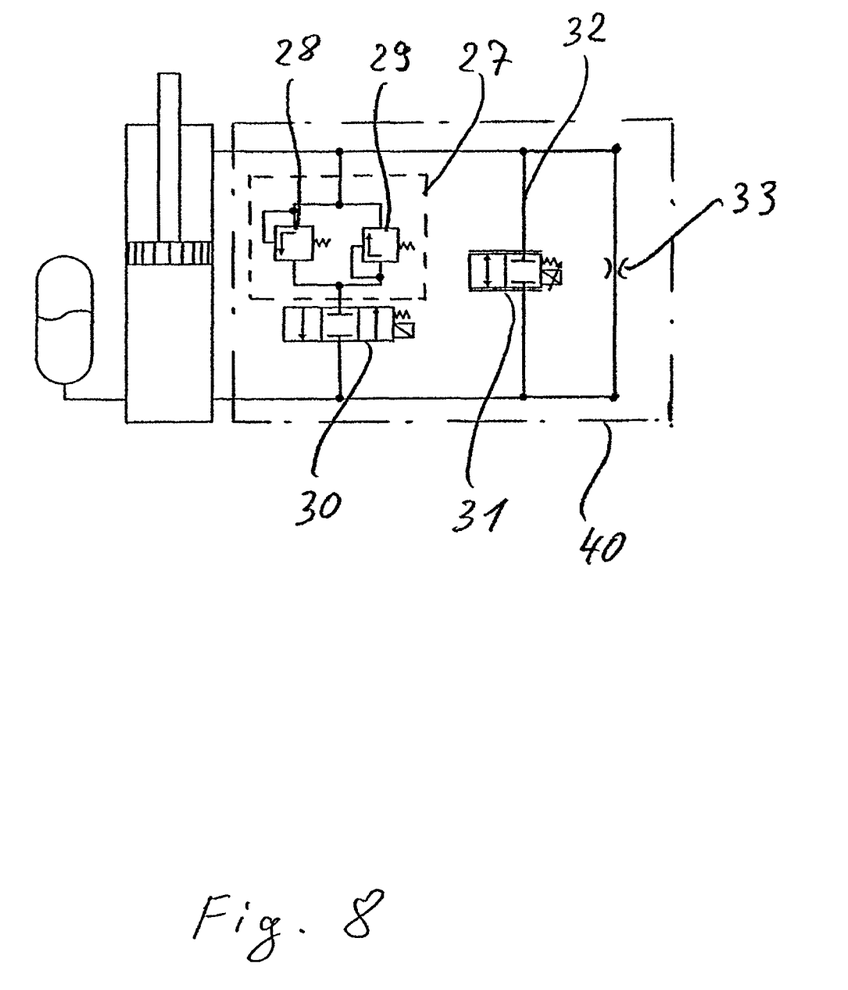

FIG. 8 illustrates another alternative embodiment. A valve assembly 27 comprises two spring-loaded checkvalves 28 and 29, each permitting the flow in a direction opposite that of the other. Checkvalves 28 and 29 have a soft performance curve and are alternately controlled by a two-to-three way valve 30. A flow-regulating valve 31 continuously opens or closes a parallel hydraulics line 32. A constricted bypass valve 33 ensures minimal unimpeded flow.

Figure 9:
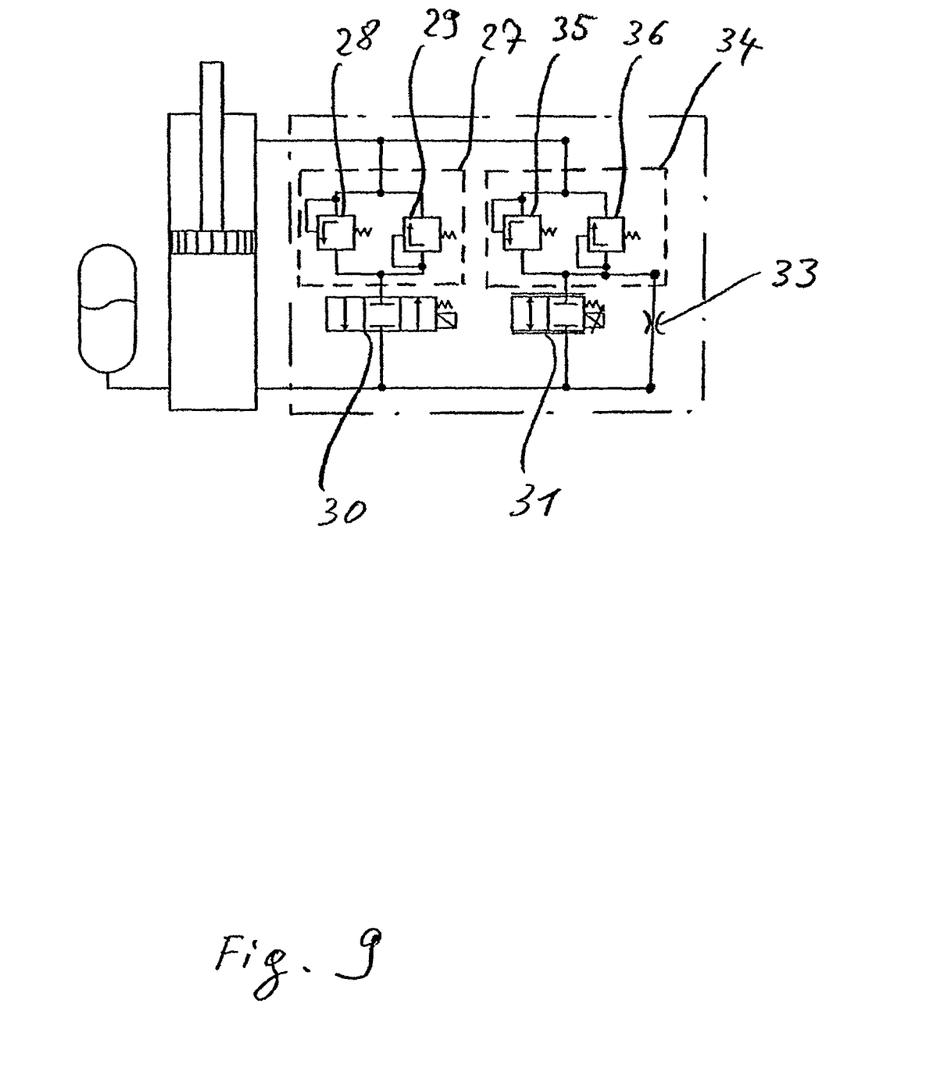

FIG. 9 illustrates an advanced version of the embodiment illustrated in FIG. 8. Upstream of flow-regulating valve 31 is a valve assembly 34 comprising two spring-loaded opposed-flow checkvalves 35 and 36. Checkvalves 35 and 36 also have a soft performance curve, although this curve can be varied between hard and soft. Bypass valve 33, which, like the one illustrated in FIG. 8, can parallel flow-regulating valve 31, two-to-three way valve 30, and/or the two series comprising a regulation-and-switching valve and checkvalves 35 and 36 or checkvalves 28 and 29, again ensures minimal flow as long as two-to-three way valve 30 and flow-regulating valve 31 are closed.

Figure 10:
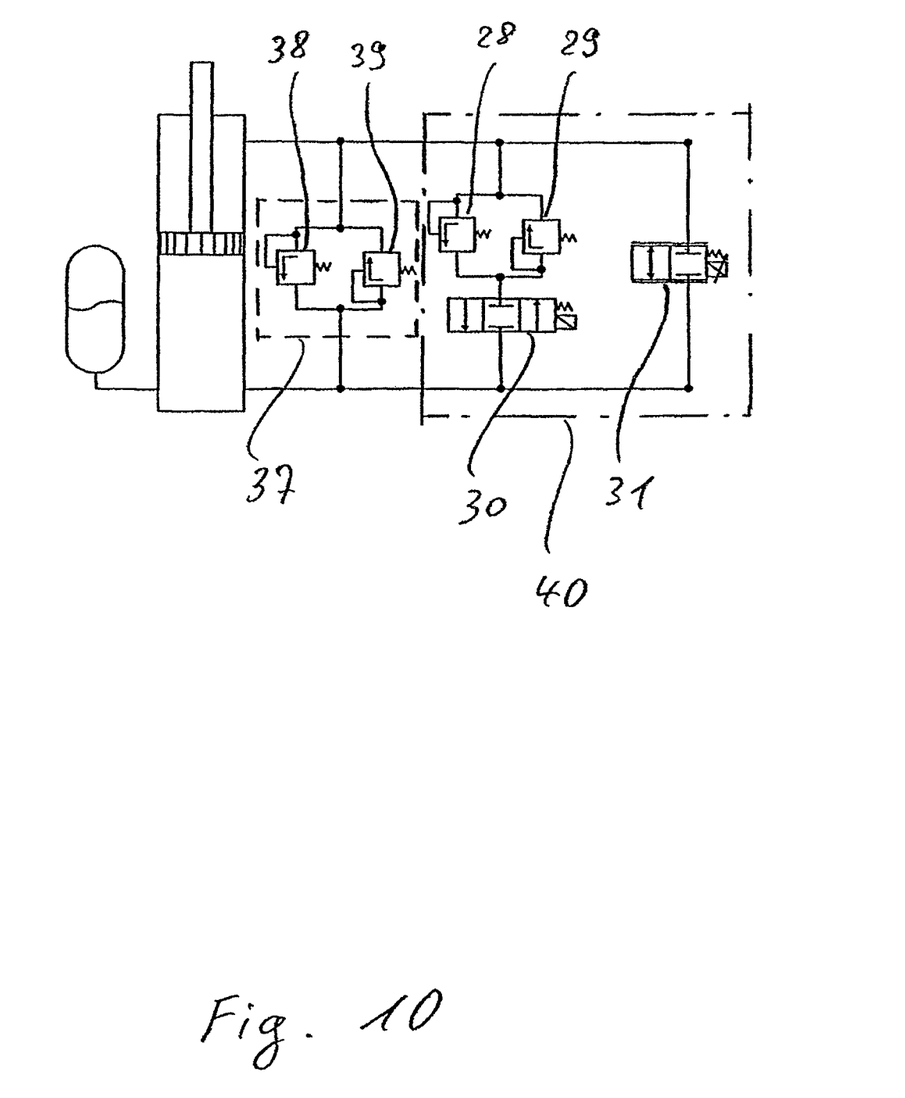

FIG. 10 also illustrates an advanced version of the embodiment illustrated in FIG. 8. This version includes, paralleling the components illustrated in FIG. 8, another, unregulable, valve assembly 37 comprising spring-loaded opposed-flow checkvalves 38 and 39. Checkvalves 38 and 39 have a hard performance curve and can preferably be integrated into the piston in the form of standard cupspring-loaded valves.

Figure 11:
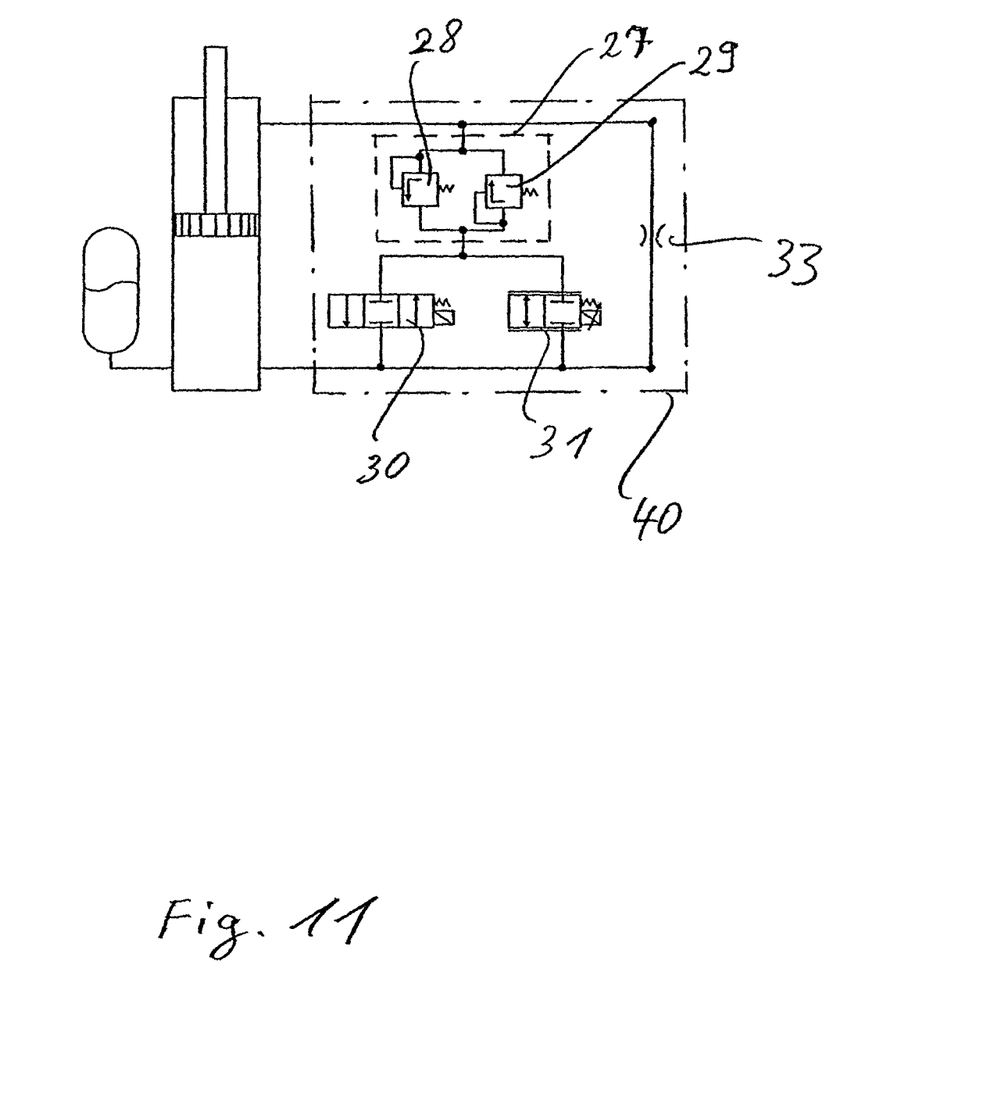

FIG. 11 illustrates another advanced version of the embodiment illustrated in FIG. 8. It includes a valve assembly 27 comprising spring-loaded opposed flow checkvalves 28 and 29 with a soft performance curve, their direction of flow being reversed by a two-to-three way valve 30. The flow-regulating valve 31 in this embodiment, however, parallels valve 30, constantly maintaining the valve assembly 27 comprising checkvalves 28 and 29 in series with the latter. This embodiment also includes a constricted bypass valve 33 that ensures minimal flow.

Figure 12:
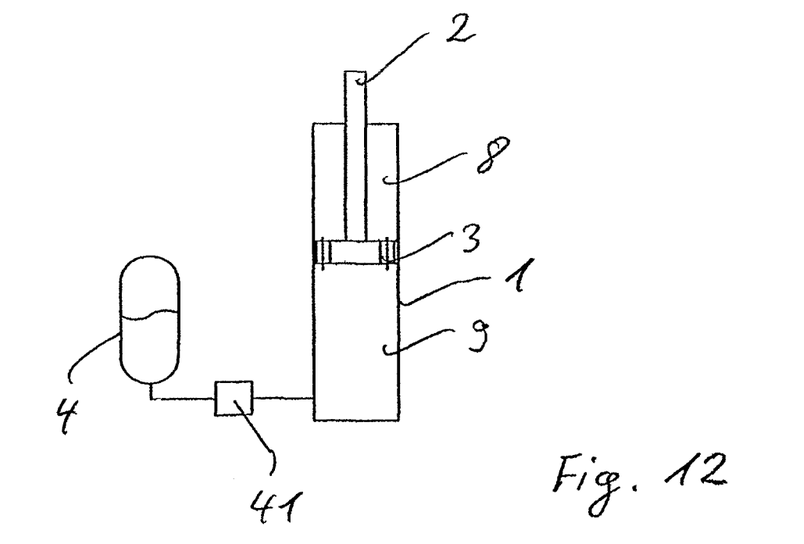
FIGS. 12 and 13 are schematics illustrating how a dashpot can be regulated in accordance with a resilient-chamber principle and with a two-chamber principle.
Figure 13:
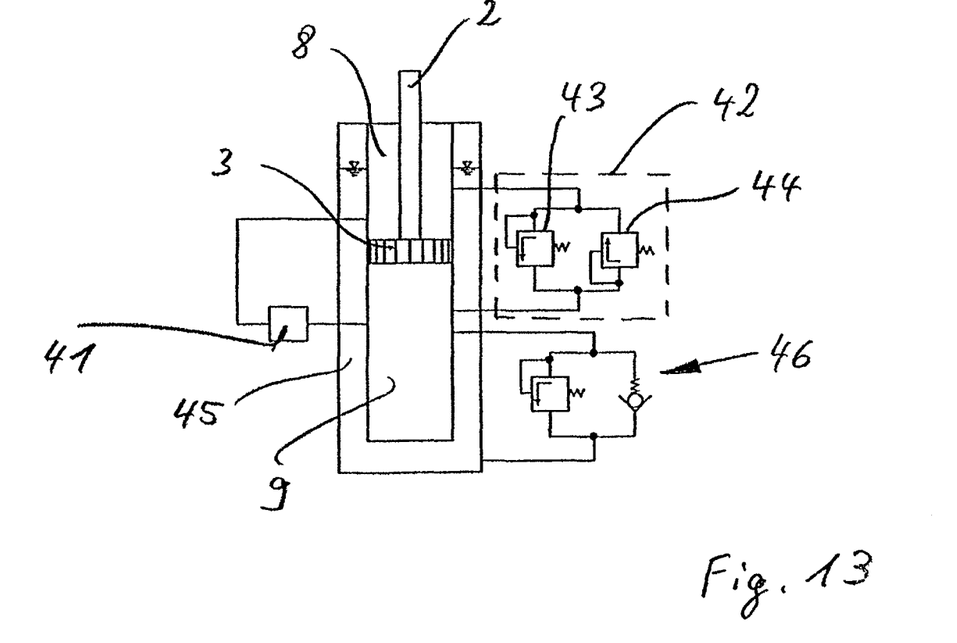

The flow-regulating assembly 40 represented by the dot-and-dash lines in FIGS. 1 through 11 is depicted in the form of a preferably self-contained block 41 in FIGS. 12 and 13. Flow-regulating block 41 can also communicate with valve assembly 18, 27, 34, or 37.

The flow-regulating block 41 represented in FIG. 12 is hydraulically interposed between lower cylinder chamber 9 and pressure-compensating gas reservoir 4.

FIG. 13 illustrates a double-cylinder dashpot with a valve assembly 42 comprising two spring-loaded check valves 43 and 44 integrated into its piston 3. A bottom valve 46 in the form of a spring-loaded one-way valve is interposed between lower cylinder chamber 9 and a pressure-compensating reservoir represented by the space 45 between the cylinder's walls. The flow regulating assembly is preferably again in the form of a self-contained block 41 located outside the dashpot and hydraulically interposed between cylinder chambers 8 and 9.

Figure 14:
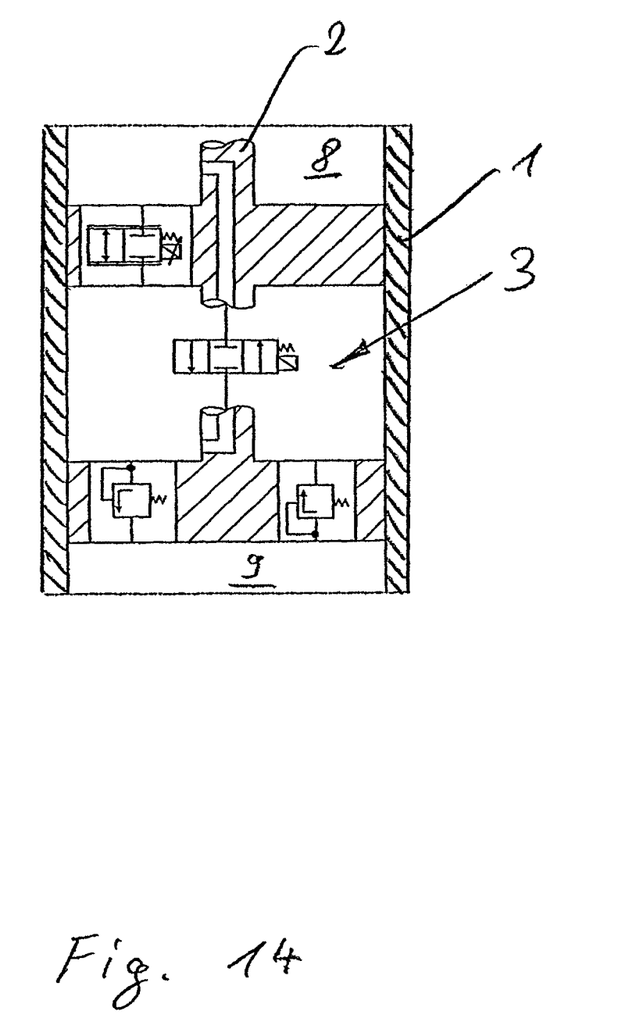
FIG. 14 is a schematic illustrating regulation inside a dashpot cylinder.

The hydraulic switching-and-regulating components in the embodiment illustrated in FIG. 14 are integrated, like the components illustrated in FIG. 11, into the dashpot's piston 3.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A regulated dashpot with shock-absorption force controls, for motor vehicles, comprising:
   at least one flow-regulating system including at least one shock-absorption component for a compression phase and for a decompression phase, a main valve assembly of said shock-absorption component is formed by at least one valve assembly with electrically variable flow resistance, regulated by a regulating valve with variable flow constriction, said flow resistance being continuous for providing continuous damping between soft and hard damping;
   at least one fixed bypass valve with a non-varying constricted flow cross-section, hydraulically and directly paralleling the flow-regulating system, said fixed bypass valve having a constant opened flow-through cross-section hydraulically in parallel with said regulating valve; wherein,
   said fixed bypass valve is integratable into said flow-regulating system and has a minimal passage for hydraulic fluid;
   said fixed bypass valve has a constant non-adjustable flow cross section; and
   said regulated dashpot further comprises preset pressure-dependent valves for said compression phase and said decompression phase being preset with a hard performance curve, said valves hydraulically paralleling said flow-regulating system and said shock absorption component.

2. The regulated dashpot as defined in claim 1, including preset adjusted pressure-dependent valves for said compression phase and said decompression phase and having a soft performance curve, said valves having the soft performance curve being activatable and deactivatable individually or separately, and being hydraulically parallel to said preset pressure-dependent valves being preset with a hard performance curve.

3. The regulated dashpot as defined in claim 1, wherein at least one of said flow-regulating system and said shock-absorption component is accommodated in a piston thereof.

4. The regulated dashpot according to claim 1, wherein said flow-regulating system and said shock-absorption component are accommodated in a separate unit in form of a flow regulating block outside the dashpot and communicating with said dashpot through hydraulic-fluid lines.

5. The regulated dashpot according to claim 1, wherein said flow regulating system comprises two hydraulically parallel regulating valves, said bypass valve being hydraulically in parallel with said two regulating valves and having minimal passage for hydraulic fluid for preventing the dashpot from being entirely blocked while said regulating valves are closed.

6. The regulated dashpot according to claim 2, wherein said preset pressure dependent valve assembly comprises first and second unregulated spring-loaded checkvalves, which parallel the spring-loaded checkvalves in the at least one flow regulating shock absorbing system.

7. An adjustable dashpot assembly with shock absorption force controls, said dashpot assembly comprising:
- a dashpot having a piston that is displaceable within a cylinder;
- at least one flow regulating shock absorbing system that includes at least one variable valve assembly for shock absorption in a compression phase and in a decompression phase;
- at least one fixed bypass valve with a nonvariable constricted flow cross section that is constantly opened and is hydraulically in parallel with said variable valve assembly; and
- a preset pressure dependent valve assembly for at least one of compression and decompression phases and being preset with a hard damping characteristic, said preset pressure dependent valve assembly hydraulically paralleling the flow regulating shock absorbing system; wherein,
- said at least one variable valve assembly has a variable flow resistance that is regulated by a regulating valve with a continuously variable flow constriction;
- said flow resistance of said variable valve assembly is continuously variable for providing continuous damping according to shock absorption performance curves settable anywhere between hard and soft.

8. The adjustable dashpot assembly according to claim 7, wherein said at least one flow regulating shock absorbing system comprises first and second hydraulically parallel regulating valves which regulate hydraulic fluid flow in the compression phase and in the decompression phase, respectively.

9. The adjustable dashpot assembly according to claim 8, wherein said at least one flow regulating shock absorbing system further comprises first and second checkvalves that are connected hydraulically in series with the first and second regulating valves which control a direction of fluid flow through said regulating valves.

10. The adjustable dashpot assembly according to claim 9, wherein said first and second checkvalves are spring-loaded checkvalves.

11. The adjustable dashpot assembly according to claim 7, wherein said preset pressure dependent valve assembly comprises first and second unregulated spring-loaded checkvalves, which parallel spring-loaded checkvalves in the at least one flow regulating shock absorbing system.

\* \* \* \* \*